March 2, 1926.

A. W. NORDGREN 1,575,074

COMBINATION FENDER BRACE BUMPER AND TRUNK SUPPORT

Filed Nov. 17, 1924     3 Sheets-Sheet 1

Witness
Kay Kusher

Inventor
Algot W. Nordgren
by Bair & Freeman Attorneys

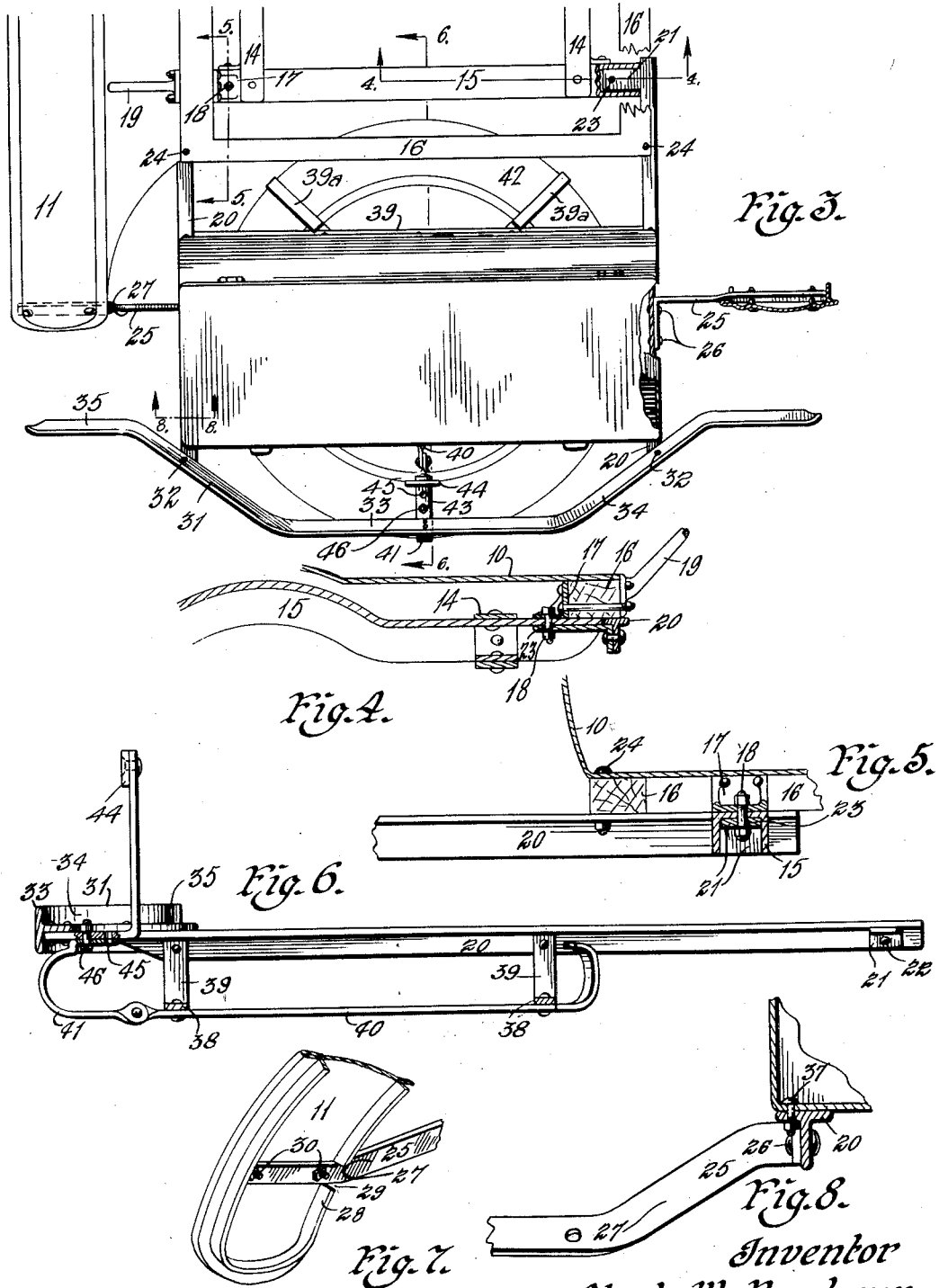

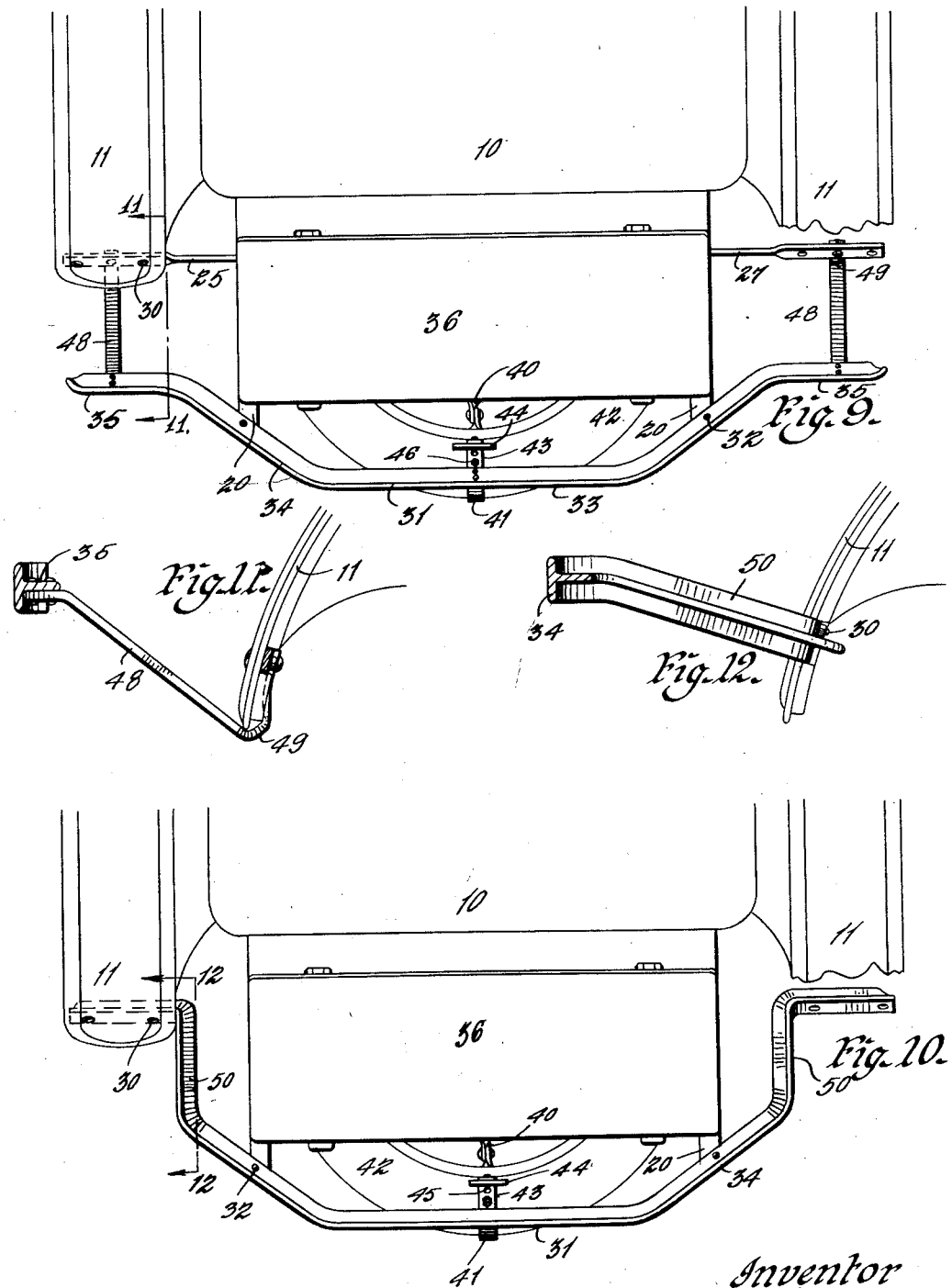

Patented Mar. 2, 1926.

1,575,074

UNITED STATES PATENT OFFICE.

ALGOT W. NORDGREN, OF ST. PAUL, MINNESOTA, ASSIGNOR TO MARQUETTE MANUFACTURING COMPANY, OF ST. PAUL, MINNESOTA.

COMBINATION FENDER BRACE BUMPER AND TRUNK SUPPORT.

Application filed November 17, 1924. Serial No. 750,292.

*To all whom it may concern:*

Be it known that I, ALGOT W. NORDGREN, a citizen of the United States, residing at St. Paul, in the county of Ramsey and State of Minnesota, have invented a certain new and useful Combination Fender Brace Bumper and Trunk Support, of which the following is a specification.

The object of my invention is to provide a combination fender brace, bumper and trunk support adapted to be secured to the chassis of an automobile for bracing the fenders and at the same time utilizing a portion of the fender bracing means as a bumper, and a portion of the fender bracing means as a trunk support, the parts being simple, durable and comparatively inexpensive in construction.

Still a further object is to provide such a device that can be secured to an automobile, utilizing portions of the standard parts of the chassis of the automobile for fastening the device thereto, thus eliminating the use of any special tools.

Still a further object is to provide a structure having a pair of supporting arms, which are connected to the fenders of the automobile, which supporting arms are braced against movement toward or from each other by a bumper element and which support a trunk forwardly of the bumper element and between the fenders of the automobile.

Still a further object is to provide a tire carrier supported upon the supporting arms of the structure for conveniently carrying a spare tire, parts being so arranged that the tire is partly covered by the trunk and no part thereof extends out beyond the outline of the bumper element.

Still a further object is to provide a bumper element for connecting the two supporting arms together for bracing them, which bumper element has its ends project beyond the supporting arms and in the rear of the fenders for protecting them, the center of the bumper being bowed rearwardly for forming a proper support for the spare tire carried by the device.

Still a further object is to provide a suitable bracket upon the bumper element substantially midway between its ends for permitting a license plate and tail light assembly to be secured thereto.

Still a further object is to provide in a combination fender brace, bumper and trunk support, means for fastening the fenders to the bumper element.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 3 is a top, plan view of the device shown in installed position, parts being broken away and shown in section to better illustrate the construction and method of fastening the same to the automobile chassis.

Figure 4 is a detail, sectional view taken on line 4—4 of Figure 3 showing one of the means for fastening the supporting arm to the cross brace of the chassis.

Figure 5 is a detail, sectional view taken on line 5—5 of Figure 3.

Figure 6 is a detail, sectional view taken on line 6—6 of Figure 3 showing the trunk removed therefrom.

Figure 7 is a detail, perspective view showing the fender brace element connecting the fender to the supporting arm.

Figure 8 is a detail, sectional view taken on line 8—8 of Figure 3 showing the fastening between the trunk and the supporting arms.

Figure 9 is a top plan view of my combination fender brace, bumper and trunk support similar to Figure 3, with a slightly modified and additional form of fastening between the bumper element and the fenders.

Figure 10 is a top, plan view similar to

Figure 1:
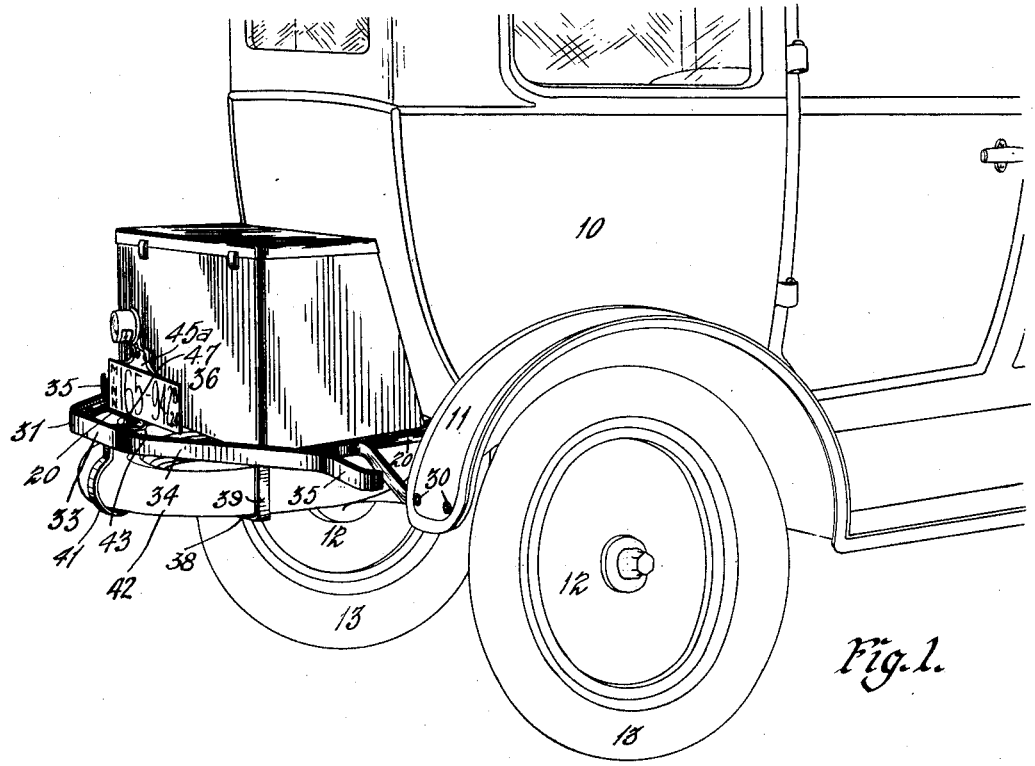
Figure 1 is a perspective view of a portion of an automobile with my improved combination fender brace, bumper and trunk support shown installed thereon.

Figure 9 of a slightly modified form of bumper element that connects directly to the fenders.

Figure 11 is a detail, sectional view taken on line 11—11 of Figure 9; and

Figure 12 is a detail, sectional view taken on line 12—12 of Figure 10 showing the bumper element fastened to the fender.

In the accompanying drawings, I have used the reference numeral 10 to indicate generally an automobile body and provided with a pair of spaced rear fenders 11 and wheels 12 having pneumatic tires 13 thereon.

The body 10 of the automobile is mounted upon a chassis 14 including a cross brace 15 channel shaped in cross section upon which is mounted a frame 16, which forms part of the body 10.

The cross brace 15 has bolted to it a clip 17 by means of a bolt 18. The frame 16 is in turn connected to the clip 17, as clearly shown in Figure 4 of the drawings.

The fenders 11 are partly supported by outwardly extending brace elements 19.

The parts just described are of the ordinary construction employed in Ford automobiles.

My improved combination fender brace, bumper and trunk support includes a pair of supporting arms 20 which are preferably formed of T iron, although angle or channel iron may be equally as well used.

The supporting arms 20 are connected to the cross brace 15 by suitable angle clips 21, which fastening is of the form shown in my copending application filed October 27, 1924, and given Serial No. 746,104.

The clip 21 is formed with an angular extension which is received against the supporting arm 20 and riveted thereto by means of a rivet 22, as clearly illustrated in Figure 4 of the drawings.

The clip 21 is formed with an opening 23 which registers with the opening in the cross brace 15 and the clip 17 for receiving the bolt 18. The ordinary bolt that is provided for holding the clip 17 to the brace 15 is taken out and I insert a new one long enough to extend through the clip 21, as well as the ordinary standard parts.

The width of the clip 21 is such that it is received between the downwardly extending flanges of the brace 15 and rests against the underside thereof so that by the use of a single bolt, I am able to retain the clip 21 in positive position.

The supporting arm 20 abuts against the end of the brace 15 and rests against the underside of a portion of the frame 16.

Each supporting arm is also fixed to the frame 16 by a bolt 24 extending through the frame 16 and through one flange of the T shaped supporting arm 20.

The supporting arms 20 extend rearwardly from the automobile chassis and are of sufficient length to project beyond the ends of the fenders 11.

In order to brace the fenders, I secure a brace element 25 to each of the supporting elements 20 by suitable rivets 26. The brace elements 25 are bent slightly downwardly, as at 27, and are then bent at an angle relative to vertical so that a portion of the brace elements may rest against the underside of the fenders 11.

The fenders 11 have the flanges 28 notched out, at as 29, for receiving the brace elements 25 and permitting them to be secured to the fender by bolts 30.

From the construction of the parts just described, it will be seen that each fender is secured at its outer end to the automobile chassis through the brace element 25 and the supporting arm 20.

A bumper member 31 is connected to the outer ends of the supporting arms 20 by rivets or bolts 32. The bumper member 31 has its ends project laterally beyond the supporting arms 20 and positioned in rear of the fenders, as clearly illustrated in Figure 3 of the drawings.

The bumper member 31 is formed with a central body portion 33 having inclined or offset portions 34 which are secured to the supporting arms 20.

The free ends of the offset or inclined portions 34 terminate in an outward extension 35. The purpose of forming the bumper 31 with an offset central portion is to accommodate a tire carrier, as will hereinafter be more fully set forth.

The bumper member 31 ties the two supporting arms together and through the medium of the bumper, together with the supporting arms and brace elements 25. I am able to tie the two fenders 11 together for preventing movement of them independently of each other.

Mounted upon the supporting arms 20 just rearwardly of the automobile body 10 is a trunk 36. The trunk 36 may be of any suitable construction and can be secured to the supporting arms by bolts 37 extending through the bottom thereof and connected to the supporting arms 20, as clearly shown in Figure 8.

Figure 2:
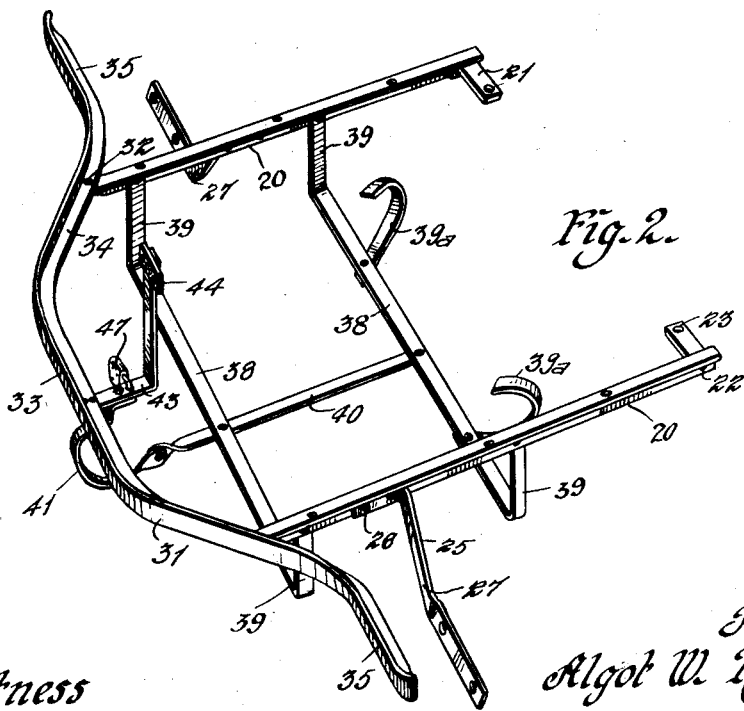
Figure 2 is a perspective view of my complete device shown alone.

In order to support a spare tire, I provide a pair of similar strap members 38 which have right angled upwardly extending arms 39, which are secured to the supporting arms 20, as clearly shown in Figure 2 of the drawings.

One of the strap members 38 has fixed to it a pair of curved tire engaging pieces 39ª. The two strap members 38 are connected together by a cross brace 40, which has a pivoted locking piece 41 thereon.

A spare tire 42 may be slipped into the tire carrier upon the strap members 38 until it is engaged by the pieces 39ª.

When the locking piece 41 is moved to position shown in Figure 2 of the drawings, it will then retain the tire 42 in proper position.

Secured to the bumper 31 is a fitting 43 which has a plate 44 thereon adapted to receive the entire number plate and tail light assembly 45ª ordinarily provided on a Ford automobile.

The locking piece 41 coacts with the fitting 43 for holding the tire 42 in locked position. The fitting 43 and the locking piece 41 are provided with a pair of registering openings 45, one for receiving a bolt 46 and the other for receiving a padlock 47.

The bumper 31 is curved outwardly near its center portion so as to serve as a bumper for the tire 42, which projects rearwardly of the trunk 36 itself, as clearly shown in the drawings.

In Figure 9 of the drawings, I have shown an additional fastening between the bumper member 31 and the fenders 11 in that I provide a strap member 48, which is connected to the bumper 31 and extends therefrom forwardly and downwardly and is then bent, as at 49, and riveted or otherwise secured to the brace element 25 at the portion that rests against the fender 11, as clearly shown in Figures 9 and 11 of the drawings.

The strap member 48 serves as an additional brace means between the combination fender brace and bumper structure and the fenders.

In Figure 10 of the drawings, I have shown the bumper 31 formed with a pair of forwardly extending portions 50 at the ends of the offset portions 34.

The free ends of the portions 50 are bent at right angles thereto and extend below the fenders 11 and are connected thereto by the bolts 30.

The portion 50 of the bumper 31 extends downwardly as well as forwardly so as to properly be aligned with the rear ends of the fenders to which they are secured.

When the type of bumper element 31 is used, as shown in Figure 10 of the drawings, then it is not necessary to use any brace elements 25 due to the fact that the bumper itself, together with the supporting arms 20, forms a direct and positive means of connection between the rear ends of the fenders and the chassis of the automobile.

My entire structure can be easily secured to the automobile chassis, as hereinbefore specified, and when installed serves to brace the fenders, to protect the rear end of the automobile by the provision of a bumper, to provide a tire carrier means as well as a trunk support.

Some changes may be made in the construction and arrangement of the various parts of my invention, without departing from the real spirit and purpose of my invention, and it is my intention to cover by my claims, any modified forms of structure or use of mechanical equivalents, which may be reasonably included within their scope.

I claim as my invention:

1. The combination with an automobile body having a pair of fenders supporting members fixed to the automobile body and extending rearwardly therefrom a bumper secured to the free ends of said members and having its ends projected beyond said members and in the rear of said fenders, said bumper member being bowed outwardly midway between its ends, brace elements connected to the fenders of the automobile, a tire support secured to said supporting members and coming within the outline of the bowed portion of the bumper and a trunk supported by said supporting members.

2. In combination with an automobile body having a pair of fenders, supporting members fixed to the automobile body and extending rearwardly therefrom, a bumper bar comprising a pair of ends and an intermediate portion arranged in spaced parallel vertical planes with the connecting parts between the end portions and intermediate portion being inclined, said inclined connecting portions being secured to the ends of said supporting members and a tire carrier suspended from said supporting members adapted to contain a tire and permitting the tire to come within the outline of the intermediate portion and inclined portions of the bumper bar.

3. In combination with an automobile body having a pair of fenders, supporting members fixed to the automobile body and extending rearwardly therefrom, a bumper bar comprising a pair of ends and an intermediate portion arranged in spaced parallel vertical planes with the connecting parts between the end portions and intermediate portion being inclined, said inclined connecting portions being secured to the ends of said supporting members and a tire carrier suspended from said supporting members adapted to contain a tire and permitting the tire to come within the outline of the intermediate portion and inclined portions of the bumper bar and brace elements connecting said supporting members with the fenders.

4. In combination with an automobile body having a pair of fenders, supporting members fixed to the automobile body and extending rearwardly therefrom, a bumper bar comprising a pair of ends and an intermediate portion arranged in spaced parallel vertical planes with the connecting parts between the end portions and intermediate portion being inclined, said inclined connecting portions being secured to the ends of said supporting members and brace elements connecting said supporting members with the fenders.

5. In combination with an automobile body having a pair of fenders, supporting members fixed to the automobile body and extending rearwardly therefrom, a bumper bar comprising a pair of ends and an intermediate portion arranged in spaced parallel vertical planes with the connecting parts between the end portions and intermediate portion being inclined, said inclined connecting portions being secured to the ends of said supporting members and a tire carrier suspended from said supporting members adapted to contain a tire and permitting the tire to come within the outline of the intermediate portion and inclined portions of the bumper bar and a trunk positioned upon said supporting arms and covering said tire carrier.

Des Moines, Iowa, November 1, 1924.

ALGOT W. NORDGREN.